(12) United States Patent
Sangi et al.

(10) Patent No.: US 10,019,707 B1
(45) Date of Patent: Jul. 10, 2018

(54) TRANSACTION CARD MODE RELATED TO LOCATING A TRANSACTION CARD

(71) Applicant: Capital One Services, LLC, McLean, VA (US)

(72) Inventors: Saleem Sangi, Ellicott City, MD (US); Molly Johnson, Alexandria, VA (US); Robert Perry, Ashburn, VA (US); Adam Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/792,503

(22) Filed: Oct. 24, 2017

(51) Int. Cl.
*G06Q 20/34* (2012.01)
*G06Q 20/32* (2012.01)
*H04W 4/80* (2018.01)
*G06K 19/073* (2006.01)
*H04B 17/318* (2015.01)

(52) U.S. Cl.
CPC ..... *G06Q 20/341* (2013.01); *G06K 19/07381* (2013.01); *H04B 17/318* (2015.01); *H04W 4/80* (2018.02)

(58) Field of Classification Search
CPC .............................. G06Q 20/32; G06Q 20/341
See application file for complete search history.

(56) References Cited

U.S. PATENT DOCUMENTS

| | | | |
|---|---|---|---|
| 6,354,493 B1 | 3/2002 | Mon | |
| 7,070,112 B2 | 7/2006 | Beenau et al. | |
| 7,156,301 B1 | 1/2007 | Bonalle et al. | |
| D573,182 S | 7/2008 | Ricketts et al. | |
| D575,332 S | 8/2008 | Parker et al. | |
| 7,588,180 B1 | 9/2009 | Carmichael et al. | |
| 7,973,657 B2 | 7/2011 | Ayed | |
| D651,237 S | 12/2011 | Mullen et al. | |
| D651,238 S | 12/2011 | Mullen et al. | |
| D651,644 S | 1/2012 | Mullen et al. | |
| D652,075 S | 1/2012 | Mullen et al. | |
| D652,076 S | 1/2012 | Mullen et al. | |
| D652,448 S | 1/2012 | Mullen et al. | |

(Continued)

OTHER PUBLICATIONS

Wang et al., "Dude, Where's My Card? RFID Positioning That Works with Muiltipath and Non-Line of Sight," https://people.csail.mit.edu/jue_w/Papers/Pinit_SIGCOMM13.pdf, Aug. 12-16, 2013, pp. 51-62.

(Continued)

*Primary Examiner* — Kamran Afshar
*Assistant Examiner* — Farideh Madani
(74) *Attorney, Agent, or Firm* — Harrity & Harrity, LLP

(57) ABSTRACT

A transaction card may determine to initiate a mode associated with the transaction card. The mode may be related to locating the transaction card. The mode may be associated with outputting a first signal. The transaction card may determine a manner in which to configure the mode based on a set of parameters. The set of parameters may include a power level of the transaction card, or a strength of a second signal associated with a connection between the transaction card and a device associated with the transaction card. The transaction card may initiate the mode after configuring the mode. The transaction card may determine to terminate the mode based on an indication that the transaction card has been located.

20 Claims, 9 Drawing Sheets

(56) References Cited

U.S. PATENT DOCUMENTS

| | | |
|---|---|---|
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| D676,487 S | 2/2013 | Mullen et al. |
| D676,904 S | 2/2013 | Mullen et al. |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| D774,134 S | 12/2016 | Hirschorn |
| 2004/0238625 A1* | 12/2004 | Walker .............. G06K 7/10079 235/380 |
| 2014/0138435 A1* | 5/2014 | Khalid ................ G06Q 20/227 235/380 |
| 2014/0254786 A1* | 9/2014 | Tendick .............. H04M 3/5175 379/265.03 |
| 2017/0092090 A1 | 3/2017 | Lerner |
| 2017/0170878 A1* | 6/2017 | Cho ..................... H04B 5/0031 |
| 2017/0213468 A1* | 7/2017 | Duerksen ................ G08G 5/04 |
| 2017/0361076 A1* | 12/2017 | Zhou ...................... G16H 40/63 |
| 2018/0032983 A1* | 2/2018 | Rogers .................. G06Q 20/18 |

OTHER PUBLICATIONS

Tile Inc., "How Tile finds," https://www.thetileapp.com/en-us/how-it-works, 2013-2017, 8 pages.

Wikipedia, "Bluetooth Low Energy," https://en.wikipedia.org/wiki/Bluetooth_Low_Energy#Proximity_sensing, Sep. 28, 2017, 10 pages.

Wikipedia, "Received signal strength indication," https://en.wikipedia.org/wiki/Received_signal_strength_indication, Jul. 22, 2017, 3 pages.

* cited by examiner

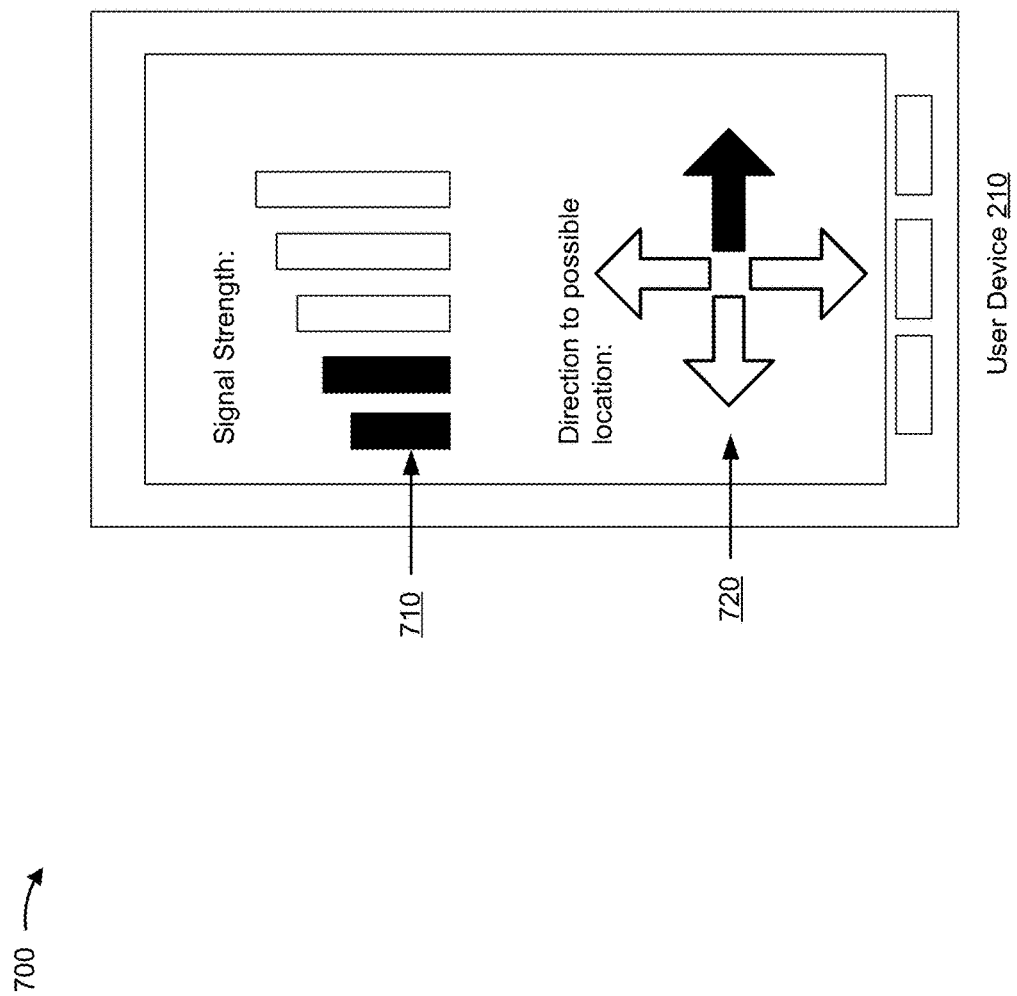

TRANSACTION CARD MODE RELATED TO LOCATING A TRANSACTION CARD

BACKGROUND

Received signal strength indicator (RSSI) may refer to the relative received signal strength in a wireless environment. RSSI may indicate a power level being received by a radio. For example, a higher relative RSSI value may indicate a stronger received signal. Conversely, and as another example, a lower relative RSSI value may indicate a weaker received signal. RSSI may be used internally in a component of a device to determine when an amount of radio energy in a channel is below a threshold.

SUMMARY

According to some possible implementations, a transaction card may include one or more processors to determine to initiate a mode associated with the transaction card. The mode may be related to locating the transaction card. The mode may be associated with outputting a first signal. The one or more processors may determine a manner in which to configure the mode based on a set of parameters. The set of parameters may include a power level of the transaction card, or a strength of a second signal associated with a connection between the transaction card and a device associated with the transaction card. The one or more processors may initiate the mode after configuring the mode. The one or more processors may determine to terminate the mode based on an indication that the transaction card has been located.

According to some possible implementations, a non-transitory computer-readable may store one or more instructions that, when executed by one or more processors, cause the one or more processors to detect information related to a proximity of a transaction card and a user device. The transaction card and the user device may be associated with each other. The one or more instructions, when executed by the one or more processors, may cause the one or more processors to determine to initiate a mode associated with the transaction card based on the information related to the proximity of the transaction card and the user device. The mode may cause the transaction card to output a signal to permit the transaction card to be located. The one or more instructions, when executed by the one or more processors, may cause the one or more processors to determine a manner in which to configure the mode based on a set of parameters. The one or more instructions, when executed by the one or more processors, may cause the one or more processors to initiate the mode after configuring the mode. The one or more instructions, when executed by the one or more processors, may cause the one or more processors to determine to terminate the mode based on an indication that the transaction card has been located.

According to some possible implementations, a method may include determining, by a transaction card, to initiate a mode associated with the transaction card based on information related to a proximity of the transaction card and a device with which the transaction card is associated. The method may include determining, by the transaction card, a manner in which to configure the mode based on a set of parameters. The set of parameters may include a power level of the transaction card, or a strength of a signal associated with a connection between the transaction card and the device. The method may include initiating, by the transaction card, the mode after configuring the mode. The mode may facilitate location of the transaction card by causing the transaction card to output another signal. The method may include monitoring, by the transaction card, the information related to the proximity of the transaction card and the device. The method may include determining, by the transaction card, to terminate the mode based on the information related to the proximity of the transaction card and the device.

BRIEF DESCRIPTION OF THE DRAWINGS

FIGS. 7A and 7B are diagrams of an example implementation relating to the example process shown in FIG. 4.

DETAILED DESCRIPTION

The following detailed description of example implementations refers to the accompanying drawings. The same reference numbers in different drawings may identify the same or similar elements.

An individual may lose or misplace a transaction card (e.g., a credit card, a gift card, a debit card, a driver's license card, a room or building access card, etc.). In some cases, the individual may not realize that the transaction card has been lost or misplaced for some amount of time. In some cases, the individual may have difficulty locating the transaction card, particularly when the transaction card is not in plain view of the individual and/or when a significant amount of time has elapsed between when the individual lost or misplaced the transaction card and when the individual realizes that the individual has lost or misplaced the transaction card.

Some implementations, described herein, provide a transaction card that is capable of using information identifying a signal strength of a connection between the transaction card and a user device to detect when the transaction card is located a threshold distance from the user device and initiating a transaction card mode based on detecting that the transaction card is located a threshold distance from the user device. Further, the transaction card may dynamically configure the transaction card mode based on a set of parameters. In this way, the transaction card may determine that an individual has possibly lost or misplaced the transaction card and may intelligently configure a transaction card mode to facilitate locating the transaction card. This conserves computing resources (e.g., of a user device associated with the individual or of a computer device of an issuer of the card) that would otherwise be consumed replacing a lost or misplaced transaction card via improved location of the transaction card. Additionally, or alternatively, this conserves resources of equipment used to produce a replacement transaction card and/or resources of equipment used to deliver (e.g., ship) a replacement transaction card. Additionally, or alternatively, this reduces an amount of time that an individual may have to spend locating a lost or misplaced transaction card, thereby increasing an efficiency of locating the transaction card.

Figure 1A:
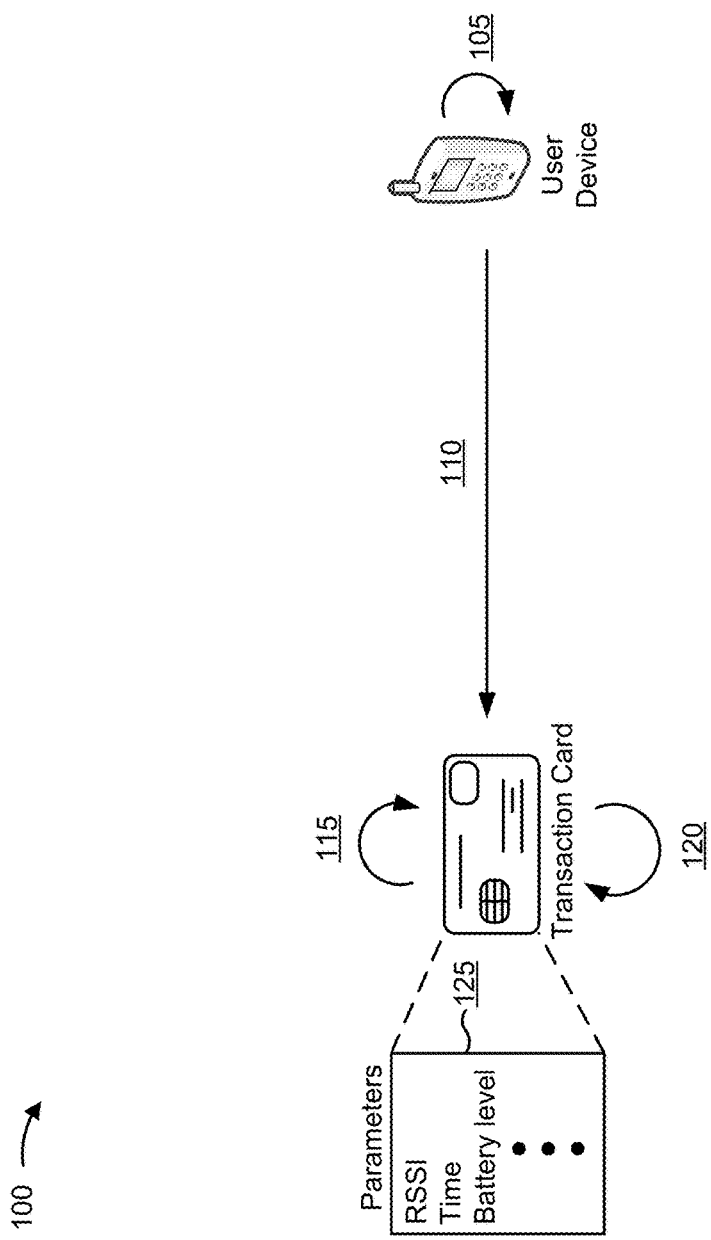
FIGS. 1A and 1B are diagrams of an overview of an example implementation described herein.
Figure 1B:
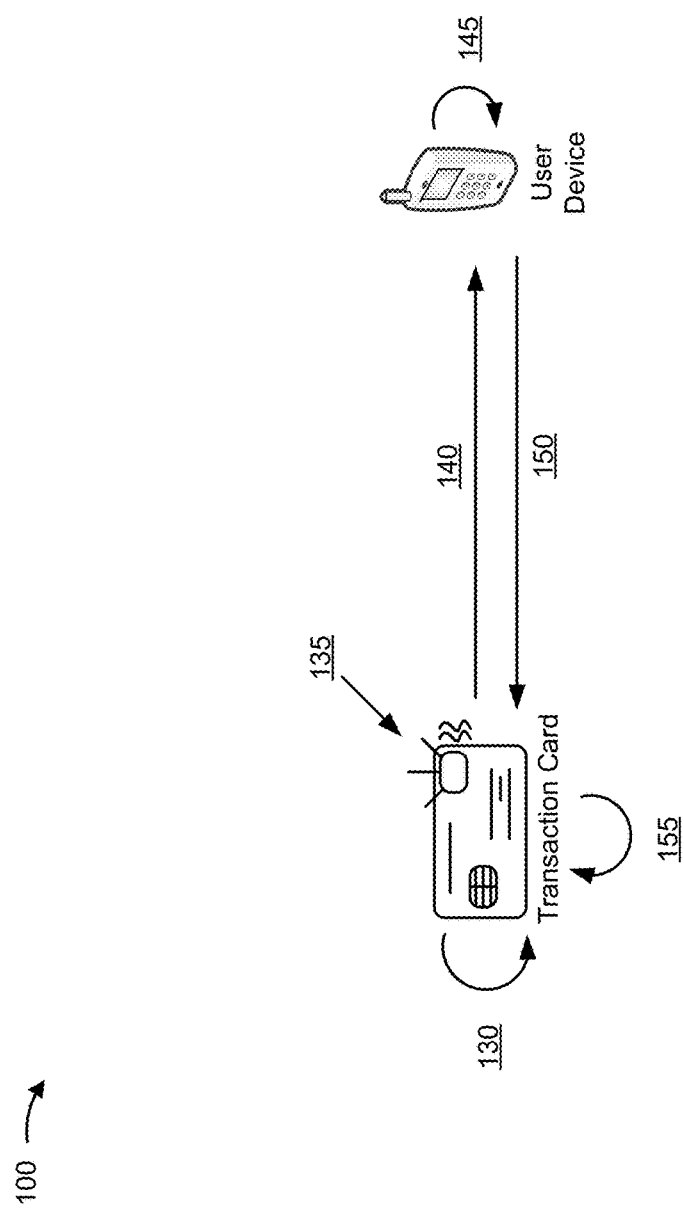

FIGS. 1A and 1B are diagrams of an overview of an example implementation 100 described herein. As shown in FIG. 1A, implementation 100 includes a transaction card and a user device.

As shown in FIG. 1A, and by reference number 105, the user device may determine that a transaction card is to initiate a transaction card mode related to locating the transaction card (e.g., a beacon mode, where the transaction card outputs a signal at a threshold interval, at a threshold power level, and/or for a threshold amount of time). For example, the user device may determine that a signal strength of a wireless signal associated with a connection between the user device and the transaction card satisfies a threshold. The wireless signal may be associated with another mode of the transaction card. For example, the wireless signal may be associated with a pairing mode that wirelessly pairs the transaction card and the user device. As shown by reference number 110, the user device may provide instructions to initiate the transaction card mode. For example, the user device may provide instructions to the transaction card to initiate a beacon mode.

As shown by reference number 115, the transaction card may determine to initiate the transaction card mode related to locating the transaction card. For example, the transaction card may determine to initiate the transaction card mode related to locating the transaction card based on receiving the instructions from the user device.

Conversely, the transaction card may determine to initiate the transaction card mode based on a signal strength of a wireless signal associated with a connection between the transaction card and the user device (e.g., rather than the user device determining to initiate the mode). For example, the transaction card may determine that the signal strength of the signal satisfies a threshold and may determine to initiate the transaction card mode based on the signal strength satisfying the threshold. This conserves processing resources of the user device by reducing or eliminating a need for the user device to determine that the transaction card is to initiate the transaction card mode. Further, this improves location of a lost or misplaced transaction card by reducing or eliminating a need for the transaction card to wait for the user device to provide instructions to initiate the mode (e.g., to wait for a user of the user device to provide input to cause the user device to provide the instructions), thereby improving an efficiency of locating the transaction card.

As shown by reference number 120, the transaction card may determine a manner in which to configure the transaction card mode based on a set of parameters and may initiate the transaction card mode after configuring the transaction card mode. For example, the transaction card may determine to configure the transaction card mode to output a signal at an interval, for a threshold amount of time, and/or at a threshold power level.

Reference number 125 shows examples of parameters that the transaction card may use to determine the manner in which to configure the transaction card mode. For example, the parameters may include a received signal strength indicator (RSSI) value of a signal associated with a connection between the user device and the transaction card, an amount of time elapsed since an RSSI value satisfied a threshold, a battery level of the transaction card, and/or the like. Continuing with the previous example, the transaction card may determine to configure the transaction card mode to output a signal at an interval, for a threshold amount of time, and/or at a threshold power level based on an RSSI value, an amount of time elapsed, and/or a battery level satisfying a threshold, as described in more detail elsewhere herein. This permits the transaction card to optimize the transaction card mode to increase a likelihood that the transaction card is located, to conserve power resources of the transaction card while in the transaction card mode (e.g., to permit the transaction card to operate in the transaction card mode for a relatively longer amount of time), and/or the like.

As shown in FIG. 1B, and by reference number 130, the transaction card may monitor information related to a proximity of the transaction card and the user device and/or may perform an action. For example, the transaction card may monitor an RSSI value of a signal associated with a connection between the transaction card and the user device and may determine a proximity of the transaction card and the user device based on whether the RSSI value satisfies a threshold. Additionally, or alternatively, and as another example, the transaction card may determine whether the transaction card can connect to the user device and may determine a proximity of the transaction card and the user device based on whether the transaction card and the user device can connect (e.g., whether the transaction card and the user device are within communicative proximity). Additionally, or alternatively, and as another example, the transaction card may monitor for an indication from the user device that the transaction card has been located, thereby indicating a proximity of the transaction card and the user device.

As shown by reference number 135, and as an example of an action that the transaction card may perform, the transaction card may trigger an alarm when information related to a proximity of the transaction card and the user device indicates that the proximity satisfies a threshold. For example, the transaction card may illuminate a light associated with the transaction card, may vibrate, may output sound via a speaker of the transaction card, and/or the like. Additionally, or alternatively, the transaction card may provide a set of instructions to the user device to trigger a similar alarm and/or the user device may trigger an alarm based on the same information.

As shown by reference number 140, and as another example of an action that the transaction card may perform, the transaction card may send, to the user device, a message related to locating the transaction card. For example, the message may identify that an RSSI of a signal associated with a wireless connection between the transaction card and the user device satisfies a threshold (e.g., indicating that a proximity of the transaction card and the user device satisfies a threshold). Additionally, or alternatively, and as another example, the message may identify an alarm that the transaction card has triggered.

As shown by reference number 145, the user device may determine a possible location of the transaction card and/or directions to the possible location. For example, the user device may determine a direction in which a strength of a signal from the transaction card satisfies a threshold, is stronger relative to other directions, and/or the like. The user device may combine RSSI values with other information, such as global positioning system (GPS) data (e.g., current and historical), triangulation data, accelerometer data, and/or the like to determine a possible location of the transaction card and/or directions to the possible location. For example, the user device may determine a location where signal strength of a signal associated with a connection between the user device and the transaction card last satisfied a threshold (e.g., indicating a possible location where the transaction card was lost or misplaced), and may determine a directions from a current location of the user device to the possible location of the transaction card. The user device may provide the directions for display via a display of the user device to permit a user of the user device to follow the directions to the possible location of the transaction card.

As shown by reference number 150, the transaction card may receive, from the user device, an instruction to terminate the transaction card mode. For example, the user device may provide the instruction based on input from a user of the user device, based on the user device and the transaction card being within communicative proximity, and/or the like. The instruction may indicate, for example, that a user of the user device has located the transaction card and/or desires that the transaction card mode not be activated.

As shown by reference number 155, the transaction card may determine to terminate the transaction card mode after receiving an indication that the transaction card has been located. For example, the transaction card may determine to terminate the transaction card mode (e.g., to terminate outputting a signal at an interval and at a threshold power level) based on receiving an instruction from the user device to terminate the transaction card mode, based on determining that the transaction card and the user device are within communicative proximity, and/or the like.

In this way, a transaction card may initiate a transaction card mode related to locating the transaction card. For example, the transaction card mode may cause the transaction card to output a signal at a threshold interval, at a threshold power level, and/or for a threshold amount of time, to permit the transaction card to be located using the signal. This reduces an amount time that an individual spends attempting to locate a lost or misplaced transaction card. In addition, this increases a likelihood of locating a transaction card, thereby conserving computing resources that would otherwise be consumed cancelling and/or replacing a lost or misplaced transaction card.

As indicated above, FIGS. 1A and 1B are provided merely as an example. Other examples are possible and may differ from what was described with regard to FIGS. 1A and 1B.

Figure 2:
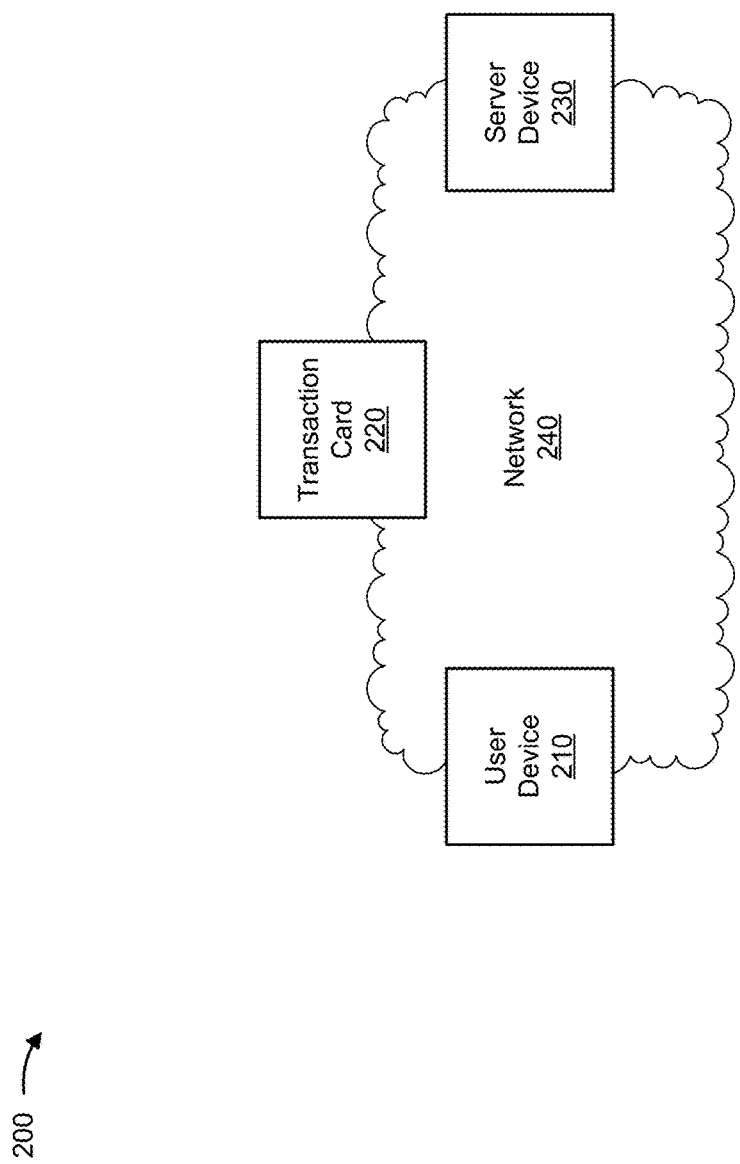
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a server device 230, and a network 240. Devices of environment 200 may interconnect via wired connections, wireless connections, or a combination of wired and wireless connections.

User device 210 includes one or more devices capable of receiving, generating, storing, processing, and/or providing information associated with a transaction card mode related to locating transaction card 220. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide an instruction to transaction card 220 to initiate a mode related to locating transaction card 220, as described elsewhere herein. Additionally, or alternatively, user device 210 may determine a possible location of transaction card 220 and/or a set of directions to the possible location, as described elsewhere herein.

Transaction card 220 includes a transaction card that can be used to complete a transaction. For example, transaction card 220 may include a credit card, a debit card, a gift card, a payment card, an automated teller machine (ATM) card, a stored-value card, a fleet card, a room or building access card, a driver's license card, and/or the like. Transaction card 220 may be capable of storing and/or communicating data for a point-of-sale (PoS) transaction with a transaction terminal. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip).

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may determine to initiate a transaction card mode related to locating transaction card 220, as described elsewhere herein. Additionally, or alternatively, transaction card 220 may determine to terminate the transaction card mode after receiving an indication that transaction card 220 has been located, as described elsewhere herein.

Server device 230 includes one or more devices capable of receiving, generating, storing, processing, and/or providing information associated with locating transaction card 220. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may receive information related to a connection between user device 210 and transaction card 220 and/or information related to a location of user device 210, as described elsewhere herein. Additionally, or alternatively, server device 230 may determine a possible location of transaction card 220 based on information related to a connection between user device 210 and transaction card 220 and/or information related to a location of user device 210, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
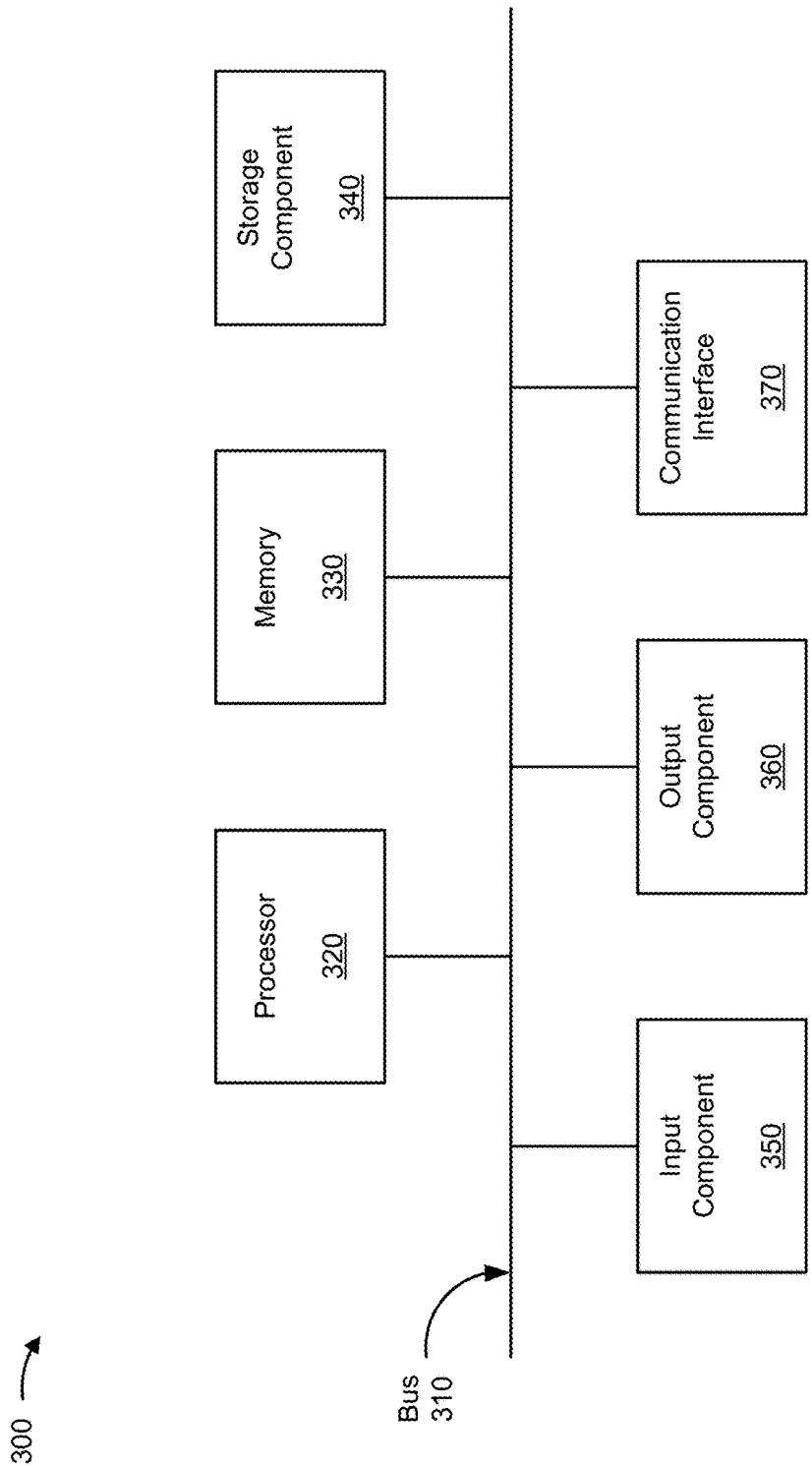
FIG. 3 is a diagram of example components of one or more devices of FIG. 2.

FIG. 3 is a diagram of example components of a device 300. Device 300 may correspond to user device 210, transaction card 220, and/or server device 230. In some implementations, user device 210, transaction card 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
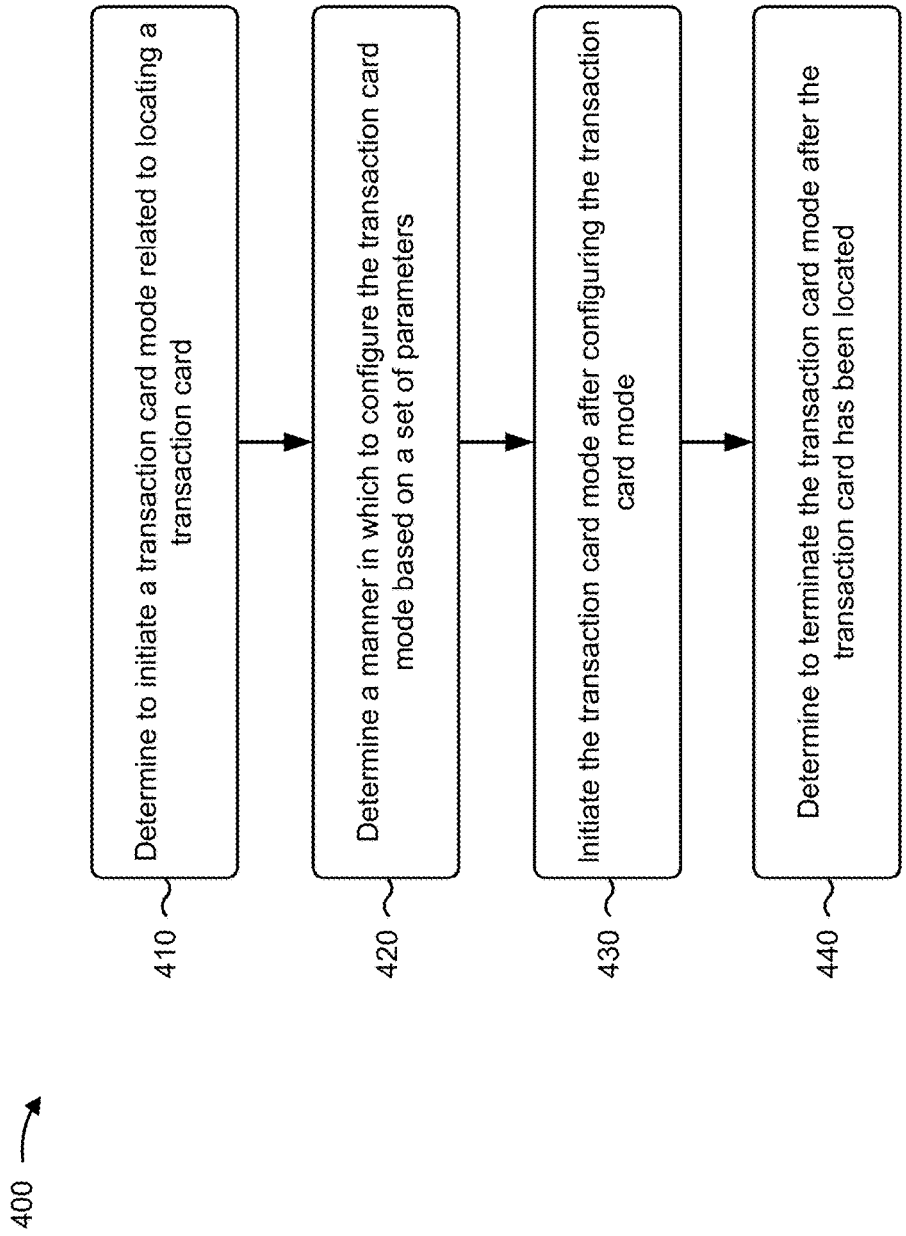
FIG. 4 is a flow chart of an example process for a transaction card mode related to locating a transaction card.

FIG. 4 is a flow chart of an example process 400 for a transaction card mode related to locating a transaction card. In some implementations, one or more process blocks of FIG. 4 may be performed by transaction card 220. In some implementations, one or more process blocks of FIG. 4 may be performed by another device or a group of devices separate from or including transaction card 220, such as user device 210 and server device 230.

As shown in FIG. 4, process 400 may include determining to initiate a transaction card mode related to locating a transaction card (block 410). For example, transaction card 220 may determine to initiate a transaction card mode related to locating a transaction card. In some implementations, transaction card 220 may determine to initiate a transaction card mode automatically (i.e., with no user input and without being instructed by another device, such as user device 210), based on input from a user of user device 210, based on receiving a set of instructions from user device 210 (e.g., when user device 210 automatically determines to initiate a transaction card mode), and/or the like.

In some implementations, transaction card 220 may be capable of operating in one or more transaction card modes. In some implementations, transaction card 220 may be capable of operating in a beacon mode. For example, when transaction card 220 is in a beacon mode, transaction card 220 may output a signal at an interval, for a threshold amount of time, and/or at a threshold power level. Additionally, or alternatively, transaction card 220 may be capable of operating in a pairing mode. For example, when transaction card 220 is operating in a pairing mode, transaction card 220 may be directly connected to user device 210, such as in a manner similar to a Bluetooth pairing. In some implementations, transaction card 220 may determine to initiate a beacon mode when transaction card 220 is operating in a pairing mode, when transaction card 220 is operating in a pairing mode and loses a connection to user device 210 (e.g., a wireless connection, such as an NFC connection, a Bluetooth connection, etc.), when transaction card 220 is not operating in another mode, and/or the like.

In some implementations, a transaction card mode may relate to locating transaction card 220. For example, the transaction card mode may cause transaction card 220 may output a signal that user device 210 can use to locate transaction card 220 (e.g., by determining a direction in which a signal strength of the signal output by transaction card 220 satisfies a threshold, has a higher RSSI value relative to other directions, etc.).

In some implementations, transaction card 220 may determine to initiate a transaction card mode based on a signal strength of a signal associated with a connection between user device 210 and transaction card 220. For example, transaction card 220 may determine to initiate a beacon mode when a signal strength of a signal associated with a connection between user device 210 and transaction card 220 satisfies a threshold (e.g., when an RSSI value satisfies a threshold).

Additionally, or alternatively, transaction card 220 may determine to initiate a transaction card mode based on a loss of a connection between user device 210 and transaction card 220. For example, transaction card 220 may detect a loss of a connection between transaction card 220 and user device 210 (e.g., a loss that is not initiated by user device 210, that is not based on a set of instructions from user device 210, etc.) and may determine to initiate the transaction card mode based on losing the connection.

Additionally, or alternatively, transaction card 220 may determine to initiate a transaction card mode based on a frequency of use of transaction card 220 and/or an amount of time elapsed since the last use of transaction card 220. For example, transaction card 220 may determine that a threshold amount of time has elapsed since transaction card 220 was last used and may determine to initiate a transaction card mode based on the threshold amount of time having elapsed.

Additionally, or alternatively, transaction card 220 may determine to initiate a transaction card mode based on a location of transaction card 220. For example, transaction card 220 may determine a location of transaction card 220 using a GPS component of transaction card 220 and may determine to initiate a transaction card mode based the information from the GPS component identifying that transaction card 220 is at a particular location.

Additionally, or alternatively, transaction card 220 may determine to initiate a transaction card mode based on a battery level of a battery associated with transaction card 220. For example, transaction card 220 may determine that a battery level of a battery associated with transaction card 220 satisfies a threshold and may determine to initiate a transaction card mode based on the battery level satisfying the threshold.

Additionally, or alternatively, transaction card 220 may determine to initiate a transaction card mode based on receiving a set of instructions from user device 210 to initiate the transaction card mode. For example, user device 210 may detect a selection of transaction card 220 via a user interface of user device 210 and may provide a set of instructions to transaction card 220 to cause transaction card 220 to initiate the transaction card mode. In some implementations, user device 210 may provide a set of instructions to transaction card 220 based on a signal strength of a signal associated with a connection between user device 210 and transaction card 220, a location of user device 210, a battery level of transaction card 220 (e.g., as determined using information from transaction card 220), and/or the like, in a manner similar to that described with respect to transaction card 220.

Additionally, or alternatively, transaction card 220 may determine to initiate (or terminate) a transaction card mode based on information that indicates a proximity of user device 210 and/or transaction card 220. In some implementations, a threshold signal strength of a signal associated with a connection between transaction card 220 and user device 210 and/or a presence of a connection between user device 210 and transaction card 220 may indicate a proximity of user device 210 and transaction card 220. For example, the signal may have a limited range and a threshold signal strength may indicate that transaction card 220 and user device 210 are within range of each other, thereby indicating that transaction card 220 and user device 210 are proximate. Additionally, or alternatively, input received from user device 210 may indicate a proximity of user device 210 and transaction card 220. For example, the input may indicate that transaction card 220 has been lost or found by a user of user device 210.

In some implementations, transaction card 220 may monitor for and/or detect information related to a proximity of transaction card 220 and user device 210, such as to determine to initiate a transaction card mode and/or to terminate the transaction card mode (e.g., using various components of transaction card 220). Additionally, or alternatively, transaction card 220 may receive information related to a proximity of transaction card 220 and user device 210, such as from user device 210.

In some implementations, user device 210 may provide, to server device 230, information identifying whether user device 210 and transaction card 220 are connected (e.g., whether transaction card 220 and user device 210 are operating in a pairing mode and are connected). In some implementations, server device 230 may monitor the information from user device 210 and may determine whether user device 210 and transaction card 220 are connected based on the information. This conserves processing resources of user device 210 by reducing or eliminating a need for user device 210 to process this information. In some implementations, server device 230 may provide a set of instructions to user device 210 to cause user device 210 to provide a set of instructions to transaction card 220 to initiate a transaction card mode based on determining that the information from user device 210 identifies that transaction card 220 and transaction card 220 are not connected. In some implementations, user device 210, rather than server device 230, may monitor information related to whether user device 210 and transaction card 220 are connected. This improves an efficiency of monitoring this type of information by reducing or eliminating a need for user device 210 to process this information.

In some implementations, transaction card 220 may communicate with server device 230 directly. For example, transaction card 220 may be capable of communicating wirelessly with server device 230 (e.g., via network 240) and may provide information to server device 230 rather than to user device 210. Additionally, or alternatively, transaction card 220 may be capable of communicating wirelessly via network 240 (e.g., over longer range networks, such as a cellular network, a Wi-Fi network, etc.) with user device 210, such as when user device 210 and transaction card 220 not in communicative proximity for other types of shorter range, direct, wireless communications (e.g., NFC communications, Bluetooth communications, etc.).

In some implementations, transaction card 220 may receive a set of instructions from user device 210 to stop transaction card 220 from initiating the transaction card mode (e.g., when transaction card 220 would otherwise initiate the transaction card mode). For example, a user of user device 210 may want to leave one of transaction card 220 and user device 210 at a particular location (e.g., at home, in a car, etc.) and move the other of transaction card 220 and user device 210 to another location. In this case, a user of user device 210 may cause user device 210 to provide a set of instructions to transaction card 220 to prevent transaction card 220 from initiating the transaction card mode for an amount of time, until transaction card 220 and user device 210 are within communicative proximity of each other at a later time, and/or the like. This conserves computing resources of transaction card 220 and/or user device 210 that would otherwise be consumed initiating a transaction card mode.

In some implementations, to stop transaction card 220 from initiating a transaction card mode, a user of transaction card 220 may provide information directly to transaction card 220. For example, the user may wave transaction card 220 in a particular pattern, may tap transaction card 220 in particular location, and/or the like.

In this way, transaction card 220 may determine to initiate a transaction card mode related to locating a transaction card.

As further shown in FIG. 4, process 400 may include determining a manner in which to configure the transaction card mode based on a set of parameters (block 420). For example, transaction card 220 may determine a manner in which to configure the transaction card mode based on a set of parameters. In some implementations, transaction card 220 may determine a manner in which to configure the transaction card mode after determining to initiate the transaction card mode.

In some implementations, transaction card 220 may determine an interval at which transaction card 220 is to output a signal associated with the transaction card mode (e.g., an interval of seconds, an interval of minutes, etc.). Additionally, or alternatively, transaction card 220 may determine an amount of time for which transaction card 220 is to output a signal associated with the transaction card mode. For example, transaction card 220 may determine to output a signal indefinitely (e.g., until a battery associated with transaction card 220 is depleted), for a threshold amount of time, for a maximum amount of time, at a particular time of the day, and/or the like. Additionally, or alternatively, transaction card 220 may determine to output a signal associated with the transaction card mode at a power level. For example, transaction card 220 may determine to output a signal at a threshold power level, at a maximum power level, and/or the like.

In some implementations, transaction card 220 may determine a manner in which to configure the transaction card mode based on a signal strength of a signal associated with a connection between user device 210 and transaction card 220. For example, transaction card 220 may determine that a signal strength of a signal satisfies a threshold (e.g., indicating that a proximity of transaction card 220 and user device 210 satisfies a threshold) and may determine a manner in which to configure the transaction card mode based on the signal strength. Continuing with the previous example, transaction card 220 may determine to configure the transaction card mode to cause transaction card 220 to output a signal at a relatively longer interval, at a relatively lower power level, and for a relatively shorter amount of time when a signal strength of a signal indicates that transaction card 220 and user device 210 are not proximate. This conserves power resources of transaction card 220 and permits transaction card 220 to operate in the transaction card mode for a relatively longer amount of time, thereby increasing a likelihood that transaction card 220 is located by a user of user device 210.

Additionally, or alternatively, transaction card 220 may determine a manner in which to configure a transaction card mode based on a battery level of a battery associated with transaction card 220. For example, transaction card 220 may determine that a battery level of a battery associated with transaction card 220 satisfies a threshold and may determine a manner in which to configure the transaction card mode based on the battery level satisfying the threshold. Continuing with the previous example, transaction card 220 may determine to configure the transaction card mode to cause transaction card 220 to output a signal at a relatively longer interval and/or at a relatively lower power level when a battery level of transaction card 220 satisfies a threshold. This conserves power resources of transaction card 220 and permits transaction card 220 to operate in the transaction card mode for a relatively longer amount of time, thereby increasing a likelihood that transaction card 220 is located by a user of user device 210.

Additionally, or alternatively, transaction card 220 may determine a manner in which to configure the transaction card mode based on a location of transaction card 220. For example, transaction card 220 may determine that transaction card 220 is at a particular location (e.g., a home of an account associated with transaction card 220) and/or is not at a particular location using information from a GPS component of transaction card 220 and may determine a manner in which to configure the transaction card mode based on transaction card 220 being at the particular location or not being at the particular location. Continuing with the previous example, transaction card 220 may determine to configure the transaction card mode to output a signal at a relatively longer interval, at a relatively lower power level, and/or for a shorter amount of time when transaction card 220 is located at a particular location. This conserves power resources of transaction card 220 when transaction card 220 is at a location where transaction card 220 may be easily located by a user of user device 210.

Additionally, or alternatively, transaction card 220 may determine a manner in which to configure the transaction card mode based on an amount of time from when transaction card 220 and user device 210 were last connected, from when a strength of a signal associated with a connection between transaction card 220 and user device 210 last satisfied a threshold, and/or the like. For example, transaction card 220 may configure the transaction card mode to output a signal at a relatively longer interval, a relatively lower power level, and/or a relatively longer amount of time when an amount of time satisfies a threshold. This conserves power resources of transaction card 220 and permits transaction card 220 to operate in the transaction card mode for a relatively longer amount of time, thereby increasing a likelihood that transaction card 220 is located by a user of user device 210.

Additionally, or alternatively, transaction card 220 may determine a manner in which to configure a transaction card mode based on a preference. For example, transaction card 220 may use information related to a preference of an account associated with transaction card 220 to determine a manner in which to configure a transaction card mode (e.g., information stored by transaction card 220, information received from user device 210, etc.). Additionally, or alternatively, transaction card 220 may determine a manner in which to configure a transaction card mode based on information identifying a default manner in which to configure the transaction card mode. For example, transaction card 220 may store and/or receive information (e.g., from user device 210) that identifies a default manner in which to configure the transaction card mode.

In some implementations, transaction card 220 may dynamically determine a manner in which to configure the transaction card mode. For example, transaction card 220 may monitor information related to a connection between transaction card 220 and user device 210, a signal strength of a signal associated with a connection between transaction card 220 and user device 210, a location of transaction card 220, and/or the like and may adjust the manner in which the transaction card mode is configured based on the information.

In some implementations, transaction card 220 may configure the transaction card mode after determining the manner in which to configure the transaction card mode. For example, transaction card 220 may configure transaction card 220 to output a signal at an interval, at a threshold power level, and/or for a threshold amount of time.

In this way, transaction card 220 may determine a manner in which to configure the transaction card mode prior to initiating the transaction card mode.

As further shown in FIG. 4, process 400 may include initiating the transaction card mode after configuring the transaction card mode (block 430). For example, transaction card 220 may initiate a beacon mode after configuring the beacon mode. In some implementations, transaction card 220 may initiate a transaction card mode, may terminate a transaction card mode, may initiate a first transaction card mode and terminate a second transaction card mode, may enable a transaction card mode, may disable a transaction card mode, may enable a first transaction card mode and disable a second transaction card mode, and/or the like. In some implementations, transaction card 220 may cause transaction card 220 to output a signal at an interval, for a threshold amount of time, and/or at a threshold power level. In this way, transaction card 220 may initiate the transaction card mode after configuring the transaction card mode.

As further shown in FIG. 4, process 400 may include determining to terminate the transaction card mode after the transaction card has been located (block 440). For example, transaction card 220 may determine to terminate the transaction card mode after the transaction card has been located.

In some implementations, transaction card 220 may determine to terminate the transaction card mode based on a signal strength of a signal associated with a connection between transaction card 220 and user device 210. For example, a signal strength satisfying a threshold may indicate that user device 210 and transaction card 220 are proximate to each other.

Additionally, or alternatively, transaction card 220 may determine to terminate a transaction card mode based on determining that transaction card 220 and user device 210 are within communicative proximity. For example, transaction card 220 may determine that transaction card 220 can connect to user device 210 (e.g., as a result of transaction card 220 and user device 210 being proximate to each other), and may determine to terminate the transaction card mode based on determining that transaction card 220 and user device 210 can connect to each other.

Additionally, or alternatively, transaction card 220 may determine to terminate the transaction card mode based on a set of instructions from user device 210 to terminate the transaction card mode. For example, a user of user device 210 may locate transaction card 220 and may cause user device 210 to provide a set of instructions to transaction card 220 to cause transaction card 220 to terminate the transaction card mode. Additionally, or alternatively, and as another example, user device 210 may determine that a signal strength of a signal being output by transaction card 220 satisfies a threshold and may determine to provide a set of instructions to transaction card 220 to cause transaction card 220 to terminate the transaction card mode based on the signal strength satisfying the threshold.

In some implementations, transaction card 220 may cease outputting a signal associated with the transaction card mode to terminate the transaction card mode. Additionally, or alternatively, transaction card 220 may initiate another transaction card mode to terminate the transaction card mode. For example, transaction card 220 may initiate a pairing mode to terminate a beacon mode. Additionally, or alternatively, transaction card 220 may provide a message to user device 210 that identifies that the transaction card mode has been terminated and/or that another transaction card mode has been initiated.

In some implementations, transaction card 220 may trigger an alarm based on information that identifies a proximity of transaction card 220 and user device 210 (e.g., based on determining that the information identifies that the proximity satisfies a threshold). For example, transaction card 220 may illuminate a light associated with transaction card 220, may output a sound via a speaker associated with transaction card 220, may vibrate, and/or the like. In some implementations, transaction card 220 may provide a set of instructions to user device 210 to cause user device 210 to perform a similar action.

Additionally, or alternatively, transaction card 220 may provide a message to user device 210. For example, transaction card 220 may provide a message that identifies a transaction card mode in which transaction card 220 is operating, that identifies that transaction card 220 and user device 210 are proximate to each other, and/or the like. Additionally, or alternatively, transaction card 220 may deactivate transaction card 220 (e.g., by locking an integrated chip associated with transaction card 220, by configuring transaction card 220 in a manner that prevents transaction card 220 from being used, etc.) when a threshold amount of time has elapsed since transaction card 220 initiated a transaction card mode without receiving an indication that transaction card 220 has been located, that a proximity of transaction card 220 and user device 210 satisfies a threshold, and/or the like. This improves a security of transaction card 220 by reducing a risk that transaction card 220 will be located and used by someone other than a cardholder of transaction card 220.

In this way, transaction card 220 may determine to terminate the transaction card mode after transaction card 220 has been located.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
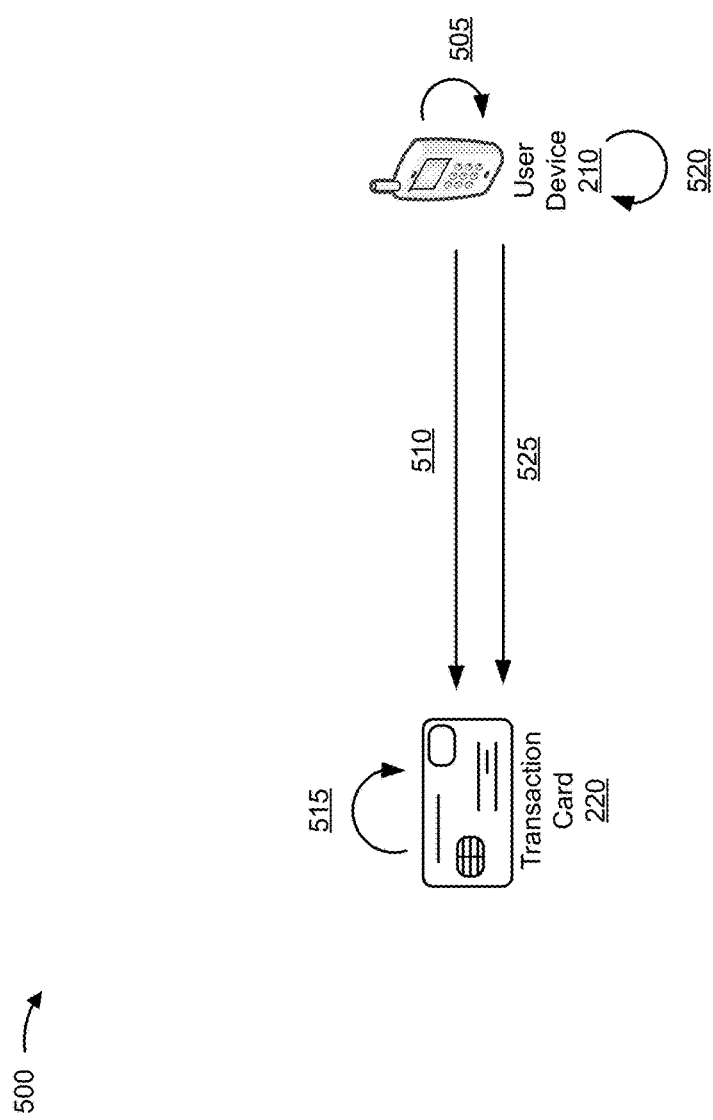
FIG. 5 is a diagram of an example implementation relating to the example process shown in FIG. 4.

FIG. 5 is a diagram of an example implementation 500 relating to example process 400 shown in FIG. 4. FIG. 5 shows an example of user device 210 initiating a transaction card mode related to locating a transaction card.

As shown in FIG. 5, and by reference number 505, user device 210 may determine to cause transaction card 220 to initiate a transaction card mode related to locating transaction card 220. For example, user device 210 may receive an indication from a user of user device 210 to cause transaction card 220 to initiate a transaction card mode. As shown by reference number 510, user device 210 may provide an indication to transaction card 220 to initiate the transaction card mode (e.g., by providing a set of instructions to transaction card 220). As shown by reference number 515, transaction card 220 may determine to initiate the transaction card mode. For example, transaction card 220 may determine to initiate the transaction card mode based on the indication from user device 210 to initiate the transaction card mode.

As shown by reference number 520, user device 210 may monitor information related to a proximity of transaction card 220 and user device 210. For example, user device 210 may determine whether a signal strength of a signal output by transaction card 220 satisfies a threshold. Additionally, or alternatively, and as another example, user device 210 may monitor for input from a user of user device 210 that indicates that the user located transaction card 220. As shown by reference number 525, user device 210 may provide an indication (e.g., a set of instructions) to transaction card 220 to terminate the transaction card mode. In some implementations, transaction card 220 may terminate the transaction card mode after receiving the indication from user device 210.

In this way, user device 210 may initiate a transaction card mode related to locating transaction card 220.

As indicated above, FIG. 5 is provided merely as an example. Other examples are possible and may differ from what was described with regard to FIG. 5.

Figure 6:
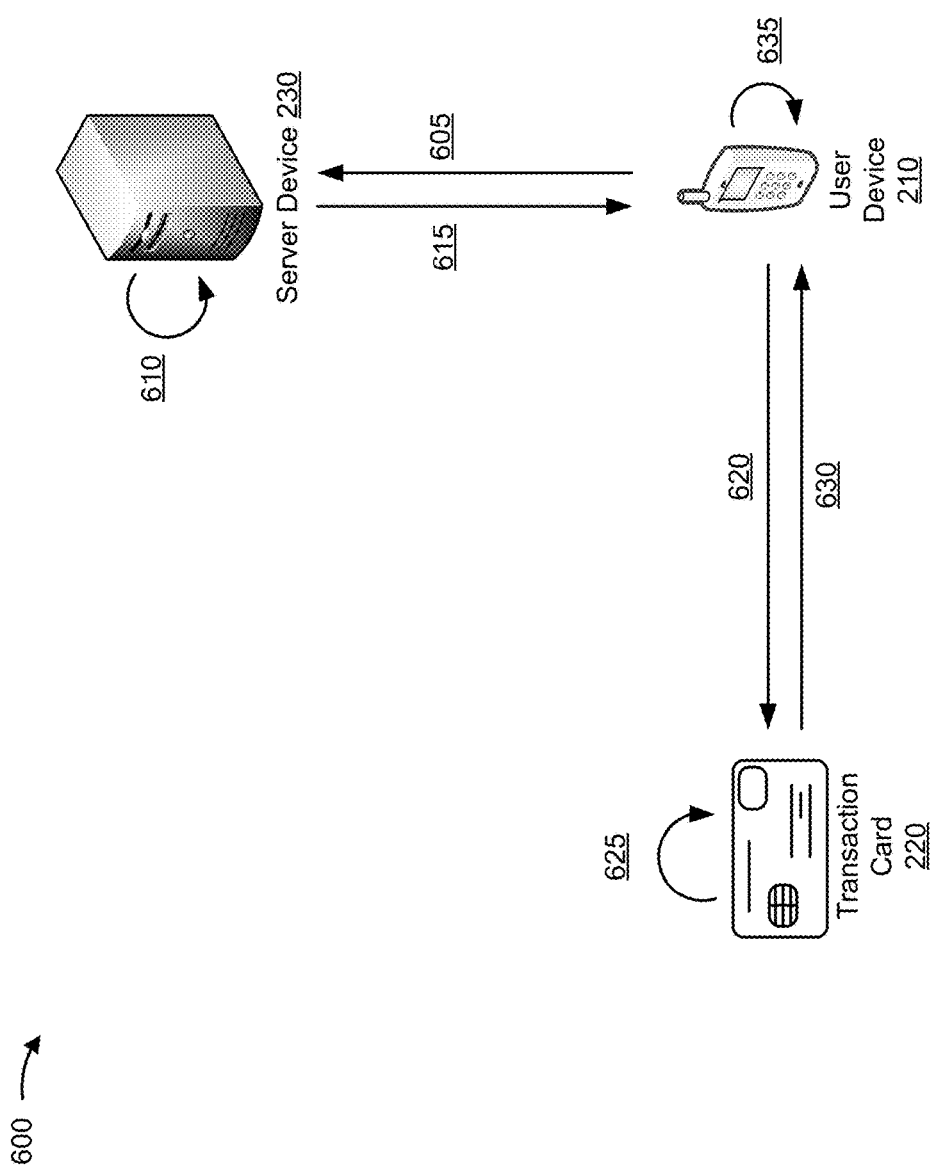
FIG. 6 is a diagram of an example implementation relating to the example process shown in FIG. 4.

FIG. 6 is a diagram of an example implementation 600 relating to example process 400 shown in FIG. 4. FIG. 6 shows an example of user device 210 communicating with server device 230 to initiate a transaction card mode.

As shown in FIG. 6, and by reference number 605, user device 210 may provide connection-related information to server device 230. For example, connection-related information may identify whether user device 210 is connected to transaction card 220 at a particular time (e.g., while in a pairing mode), a GPS location of user device 210 when connected to transaction card 220, and/or the like. As shown by reference number 610, server device 230 may determine to cause a transaction card mode of transaction card 220 to be initiated. For example, server device 230 may determine that user device 210 and transaction card 220 are no longer connected based on the connection-related information and may determine to cause transaction card 220 to initiate a transaction card mode based on determining that transaction card 220 and user device 210 are no longer connected.

As shown by reference number 615, server device 230 may provide an indication to user device 210 to initiate the transaction card mode. For example, server device 230 may provide an indication to cause transaction card 220 to initiate a beacon mode. As shown by reference number 620, user device 210 may provide an indication to transaction card 220 to initiate the transaction card mode. For example, user device 210 may provide a set of instructions to transaction card 220 to initiate the transaction card mode.

As shown by reference number 625, transaction card 220 may determine a manner in which to configure the transaction card mode based on a set of parameters. For example, transaction card 220 may determine a manner in which to configure the transaction card mode in a manner similar to that described elsewhere herein. As shown by reference number 630, transaction card 220 may output a signal associated with the transaction card mode (e.g., at an interval, at a threshold power level, and/or for a threshold amount of time), in a manner similar to that described elsewhere herein.

As shown by reference number 635, user device 210 may determine a direction and/or a proximity to transaction card 220. For example, user device 210 may measure a signal strength of a signal output by transaction card 220 and may determine a direction, relative to other directions, in which the signal strength is higher, satisfies a threshold, and/or the like (e.g., using information from an accelerometer component of user device 210). Additionally, or alternatively, and as another example, user device 210 may use connection-related information to determine a location where user device 210 and transaction card 220 were last connected and may determine a set of directions to the location. Additionally, or alternatively, and as another example, user device 210 may determine a proximity of user device 210 and transaction card 220 based on a signal strength of a signal output by transaction card 220 (e.g., based on an RSSI value of the signal satisfying a threshold). In some implementations, user device 210 may receive an indication that transaction card 220 has been located and may provide an indication to transaction card 220 to terminate the transaction card mode, in a manner similar to that described elsewhere herein.

In some implementations, when transaction card 220 and user device 210 are within communicative proximity, transaction card 220 may send a signal to user device 210. In some implementations, user device 210 may record connection-related information based on receiving the signal (e.g., a time at which the signal was received, a location of user device 210 when user device 210 received the signal, etc.) and may determine a set of directions to the location where user device 210 received the signal.

In this way, user device 210 may communicate with server device 230 to initiate a transaction card mode.

As indicated above, FIG. 6 is provided merely as an example. Other examples are possible and may differ from what was described with regard to FIG. 6.

Figure 7B:
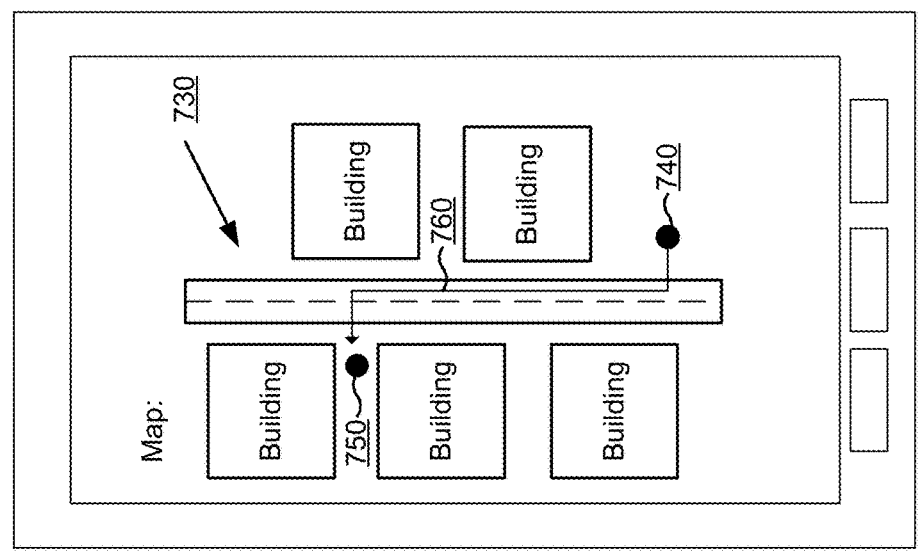

FIGS. 7A and 7B are diagrams of an example implementation 700 relating to example process 400 shown in FIG. 4. FIGS. 7A and 7B show an example of various user interfaces that user device 210 may display related to locating transaction card 220.

As shown in FIG. 7A, and by reference number 710, user device 210 may display information that identifies a signal strength of a signal that transaction card 220 is outputting (e.g., a signal that transaction card 220 is outputting while operating in a transaction card mode). In some implementations, the information that user device 210 displays may vary based on a direction in which user device 210 is pointed (e.g., a direction in which a portion of user device 210 that includes a radio frequency (RF) component is pointed). Displaying information in this manner permits a user of user device 210 to determine a signal strength, in a direction, of a signal output by transaction card 220, thereby permitting the user and/or user device 210 to determine a possible direction in which transaction card 220 is located.

As shown by reference number 720, user device 210 may display additional information that indicates a direction, relative to a current direction in which user device 210 is pointed, in which a signal strength value satisfies a threshold (e.g., a relative direction in which an RSSI value satisfies a threshold), a direction in which a signal strength value is the highest value relative to other values for other directions, and/or the like. In some implementations, user device 210 may determine relative directions using an accelerometer component associated with user device 210, a GPS component associated with user device 210, a compass component associated with user device 210, and/or the like. As a specific example, and as further shown by reference number 720, user device 210 may display a highlighted arrow pointing to the right, thereby indicating that transaction card 220 is possibly located in a direction to the right of a direction that user device 210 is currently pointed. In this way, user device 210 may display information that identifies a possible location of transaction card 220 based on a signal strength of a signal output by transaction card 220.

As shown in FIG. 7B, and by reference number 730, user device 210 may determine a set of directions from a current location of user device 210 to a possible location of transaction card 220 and may provide the set of directions for display on a map. For example, user device 210 may determine a possible location of transaction card 220 using information that identifies GPS locations of user device 210 and whether user device 210 and transaction card 220 were connected (e.g., were paired) at the GPS locations. Continuing with the previous example, user device 210 may determine a set of directions from a current location of user device 210 to the last location of user device 210 where transaction card 220 and user device 210 were connected.

As shown by reference numbers 740 through 760, user device 210 may provide various information for display on a map. In some implementations, and as shown by reference number 740, user device 210 may display information that identifies a current location of user device 210. Additionally, or alternatively, and as shown by reference number 750, user device 210 may display information that identifies a possible location of transaction card 220 (e.g., a location where user device 210 and transaction card 220 were last connected in a pairing mode). Additionally, or alternatively, and as shown by reference number 760, user device 210 may display information that identifies a route from the current location of user device 210 to a possible location of transaction card 220. In this way, user device 210 may facilitate locating transaction card 220, such as when a user of user device 210 has lost or misplaced transaction card 220.

In some implementations, server device 230 may determine a set of directions to transaction card 220, rather than user device 210 determining the set of directions. For example, server device 230 may use connection-related information received from user device 210 to determine a set of directions from a current location of user device 210 to a possible location of transaction card 220 and may provide the set of directions to user device 210 for display. This increases an efficiency of determining sets of directions for multiple user devices 210 by permitting a centralized device to determine a set of directions for multiple user devices 210, by permitting batch processing of information from multiple user devices 210, and/or the like. In addition, this conserves processing resources of user device 210 by reducing or eliminating a need for user device 210 to determine a set of directions.

In this way, user device 210 may determine a set of directions from a current location of user device 210 to a possible location of transaction card 220 and may provide information identifying the set of directions for display via user device 210.

As indicated above, FIG. 7 is provided merely as an example. Other examples are possible and may differ from what was described with regard to FIG. 7.

In this way, transaction card 220 may initiate a transaction card mode that can facilitate locating transaction card 220. For example, the transaction card mode may cause transaction card 220 to output a signal at a threshold interval, at a threshold power level, and/or for a threshold amount of time, to permit transaction card 220 to be located using the signal. This reduces an amount time needed to locate a lost or misplaced transaction card 220. In addition, this conserves computing resources that would otherwise be consumed attempting to locate transaction card 220 and/or that would otherwise be consumed cancelling and/or replacing a lost or misplaced transaction card 220.

Although some implementations are described with respect to a threshold (e.g., determining whether transaction card 220 is a threshold distance from user device 210, determining a threshold interval at which to output a signal, determining a threshold amount of time for which to output a signal, etc.), the implementations apply equally to satisfying a threshold, i.e., exceeding or failing to exceed a threshold as relevant. For example, the implementations apply equally to determining whether a distance between transaction card 220 and user device 210 satisfies or exceeds a threshold, determining whether a signal strength satisfies or is below a threshold, determining an interval that satisfies or is within a threshold, determining an amount of time that satisfies a threshold, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transaction card, comprising:
one or more memories; and
one or more processors, communicatively coupled to the one or more memories, to: detect information related to a proximity of the transaction card and a device, the transaction card and the device being associated with each other;
determine to initiate a mode associated with the transaction card,
the mode being related to locating the transaction card,
the mode being associated with outputting a first signal;
determine a manner in which to configure the mode based on a set of parameters,
the set of parameters including:
a power level of the transaction card, or
a strength of a second signal associated with a connection between the transaction card and the device associated with the transaction card;
initiate the mode after configuring the mode;
determine that the information related to the proximity indicates that the proximity of the transaction card and the device satisfies a threshold;
trigger an alarm after determining that the information related to the proximity indicates that the proximity of the transaction card and the device satisfies the threshold,
the alarm including:
a light,
a sound, or
a vibration; and
determine to terminate the mode based on an indication that the transaction card has been located.

2. The transaction card of claim 1, where the one or more processors are further to:
receive, from the device, an indication to initiate the mode; and
where the one or more processors, when determining to initiate the mode, are to:
determine to initiate the mode after receiving the indication from the device.

3. The transaction card of claim 1, where the one or more processors are further to:
determine that the strength of the second signal satisfies a threshold; and
where the one or more processors, when determining to initiate the mode, are to:
determine to initiate the mode after determining that the strength of the second signal satisfies the threshold.

4. The transaction card of claim 1, where the set of parameters further includes:
pre-configured information associated with the mode,
a user preference of a user associated with the transaction card or the device, or
an amount of time since the strength of the second signal satisfied a threshold.

5. The transaction card of claim 1, where the one or more processors, when determining the manner in which to configure the mode, are to:
determine to configure the mode to transmit the first signal at an interval based on the set of parameters.

6. The transaction card of claim 1, where the one or more processors are further to:
determine to initiate another mode after determining to terminate the mode.

7. The transaction card of claim 1, where the one or more processors are further to:
receive the indication from the device or based on information related to the proximity of the transaction card and the device; and
where the one or more processors, when determining to terminate the mode, are to:
determine to terminate the mode after receiving the indication from the device or based on the information related to the proximity.

8. A non-transitory computer-readable medium storing instructions, the instructions comprising:
one or more instructions that, when executed by one or more processors, cause the one or more processors to:
detect information related to a proximity of a transaction card and a user device, the transaction card and the user device being associated with each other;
determine to initiate a mode associated with the transaction card based on the information related to the proximity of the transaction card and the user device, the mode to cause the transaction card to output a signal to permit the transaction card to be located;
determine a manner in which to configure the mode based on a set of parameters;
initiate the mode after configuring the mode;
determine that the information related to the proximity indicates that the proximity of the transaction card and the user device satisfies a threshold;
trigger an alarm after determining that the information related to the proximity indicates that the proximity of the transaction card and the user device satisfies the threshold,
the alarm including:
a light,
a sound, or
a vibration; and
determine to terminate the mode based on an indication that the transaction card has been located.

9. The non-transitory computer-readable medium of claim 8, where the one or more instructions, when executed by the one or more processors, further cause the one or more processors to:
receive, from the user device, the indication that the transaction card has been located; and where the one or more instructions, that cause the one or more processors to determine to terminate the mode, cause the one or more processors to:
  determine to terminate the mode after receiving the indication from the user device.

10. The non-transitory computer-readable medium of claim 8, where the one or more instructions, that cause the one or more processors to determine the manner in which to configure the mode, cause the one or more processors to:
  determine to configure the mode to output the signal associated with the mode at a threshold power level; and
  determine to configure the mode to output the signal at an interval.

11. The non-transitory computer-readable medium of claim 10, where the one or more instructions, when executed by the one or more processors, further cause the one or more processors to:
  output the signal at the interval after initiating the mode.

12. The non-transitory computer-readable medium of claim 8, where the one or more instructions, when executed by the one or more processors, further cause the one or more processors to:
  monitor the information related to the proximity of the transaction card and the user device;
  receive the indication based on monitoring the information related to the proximity of the transaction card and the user device; and
  where the one or more instructions, that cause the one or more processors to determine to terminate the mode, cause the one or more processors to:
    determine to terminate the mode after receiving the indication.

13. The non-transitory computer-readable medium of claim 8, where the one or more instructions, that cause the one or more processors to determine to initiate the mode, cause the one or more processors to:
  determine to initiate the mode based on a strength of another signal satisfying a threshold,
    the other signal being associated with a connection between the transaction card and the user device.

14. The non-transitory computer-readable medium of claim 8, where the set of parameters further includes:
  pre-configured information associated with the mode,
  a user preference of a user associated with the transaction card or the user device, or
  an amount of time since the strength of the other signal satisfied the threshold.

15. A method, comprising:
  detecting, by a transaction card, information related to a proximity of the transaction card and a device,
    the transaction card and the device being associated with each other;
  determining, by the transaction card, to initiate a mode associated with the transaction card based on the information related to the proximity of the transaction card and the device with which the transaction card is associated;
  determining, by the transaction card, a manner in which to configure the mode based on a set of parameters,
    the set of parameters including:
      a power level of the transaction card, or
      a strength of a signal associated with a connection between the transaction card and the device;
  initiating, by the transaction card, the mode after configuring the mode,
    the mode facilitating location of the transaction card by causing the transaction card to output another signal;
  monitoring, by the transaction card, the information related to the proximity of the transaction card and the device;
  determining, by the transaction card, that the information related to the proximity indicates that the proximity of the transaction card and the device satisfies a threshold; and
  triggering, by the transaction card, an alarm after determining that the information related to the proximity indicates that the proximity of the transaction card and the device satisfies the threshold,
    the alarm including:
      a light,
      a sound, or
      a vibration; and
  determining, by the transaction card, to terminate the mode based on the information related to the proximity of the transaction card and the device.

16. The method of claim 15, further comprising:
  transmitting the other signal at an interval for a threshold amount of time after determining the manner in which to configure the mode.

17. The method of claim 15,
  where determining to initiate the mode comprises:
    determining to initiate the mode after detecting the information related to the proximity of the transaction card and the device.

18. The method of claim 15, further comprising:
  configuring the mode to transmit the other signal,
    the other signal to facilitate location of the transaction card.

19. The method of claim 15, further comprising:
  determining to initiate another mode after determining to terminate the mode,
    the other mode being related to the connection between the transaction card and the device.

20. The method of claim 15, where the set of parameters further includes:
  pre-configured information associated with the mode,
  a user preference of a user associated with the transaction card or the device, or
  an amount of time since the strength of the other signal satisfied the threshold.

* * * * *